United States Patent
Furuzawa et al.

(10) Patent No.: US 7,578,098 B2
(45) Date of Patent: Aug. 25, 2009

(54) DOOR WEATHER STRIP FOR MOTOR VEHICLE

(75) Inventors: Hidenori Furuzawa, Aichi-ken (JP); Yoshitaka Sugiyama, Aichi-ken (JP); Masahiro Nozaki, Aichi-ken (JP); Yukio Matsuda, Okazaki (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 543 days.

(21) Appl. No.: 11/214,050

(22) Filed: Aug. 30, 2005

(65) Prior Publication Data
US 2006/0042170 A1 Mar. 2, 2006

(30) Foreign Application Priority Data
Sep. 2, 2004 (JP) ............................. 2004-255777

(51) Int. Cl.
*E06B 7/22* (2006.01)
(52) U.S. Cl. .................... 49/498.1; 49/475.1; 49/490.1; 49/489.1; 49/495.1
(58) Field of Classification Search ................ 49/475.1, 49/498.1, 490.1, 489.1, 495.1
See application file for complete search history.

(56) References Cited

U.S. PATENT DOCUMENTS

| | | | | |
|---|---|---|---|---|
| 1,928,992 A | * | 10/1933 | Masterman et al. | 138/103 |
| 2,935,771 A | * | 5/1960 | Hatcher, Jr. | 49/493.1 |
| 3,164,870 A | * | 1/1965 | Stolarczyk et al. | 49/495.1 |
| 4,047,751 A | * | 9/1977 | Koike | 296/146.9 |
| 4,496,186 A | * | 1/1985 | Tuchiya et al. | 296/146.9 |
| 4,625,459 A | * | 12/1986 | Warner | 49/489.1 |
| 4,989,315 A | * | 2/1991 | Mesnel et al. | 29/527.2 |
| 5,038,521 A | * | 8/1991 | Andrzejewski et al. | 49/441 |
| 5,042,200 A | * | 8/1991 | Ugawa | 49/490.1 |
| 5,050,349 A | * | 9/1991 | Goto et al. | 49/489.1 |
| 5,072,545 A | * | 12/1991 | Nozaki | 49/490.1 |
| 5,101,598 A | * | 4/1992 | Fujihira | 49/498.1 |
| 5,345,719 A | * | 9/1994 | Karwande | 49/502 |
| 5,606,828 A | * | 3/1997 | Hall et al. | 49/490.1 |
| 5,735,089 A | * | 4/1998 | Smith et al. | 52/202 |
| 5,743,047 A | * | 4/1998 | Bonne et al. | 49/490.1 |
| 6,250,018 B1 | * | 6/2001 | Kawai et al. | 49/479.1 |

(Continued)

FOREIGN PATENT DOCUMENTS

JP 58078825 A * 5/1983

(Continued)

*Primary Examiner*—Katherine W Mitchell
*Assistant Examiner*—Jeff Tang
(74) *Attorney, Agent, or Firm*—Posz Law Group, PLC

(57) ABSTRACT

A door weather strip capable of surely closing a gap between a door of a motor vehicle and a door opening portion of a vehicle body while exhibiting excellent sealing properties with good appearance. The door weather strip includes a base portion for attachment to an outer periphery of the door, and a seal portion which is integrally formed with the base portion for contacting the door opening portion. The seal portion includes a main seal and a sub-seal which is provided on an outer side of the main seal. The sub-seal has a protrusion which protrudes from the base portion towards the door opening portion, and a tubular part having a generally triangular cross-section. One corner of the tubular part is integrally joined to the protrusion such that one wall which faces the one corner is located between the door and the door opening portion.

2 Claims, 3 Drawing Sheets

U.S. PATENT DOCUMENTS

| | | |
|---|---|---|
| 6,393,766 B2 | 5/2002 | Nozaki et al. |
| 6,397,525 B1 * | 6/2002 | Ishibashi et al. ............ 49/484.1 |
| 6,536,833 B2 | 3/2003 | Nozaki |
| 6,537,182 B2 | 3/2003 | Slawinski et al. |
| 6,539,671 B2 | 4/2003 | Yamaguchi et al. |
| 6,832,451 B2 * | 12/2004 | Yamashita et al. .......... 49/498.1 |
| 6,848,217 B2 * | 2/2005 | Hashimoto et al. .......... 49/490.1 |
| 7,045,189 B2 * | 5/2006 | Hui et al. ....................... 428/99 |
| 7,178,809 B2 * | 2/2007 | Kuzuya et al. ............... 277/631 |
| 2001/0010856 A1 | 8/2001 | Teramoto et al. |
| 2003/0121210 A1 * | 7/2003 | Fujimura et al. ............ 49/479.1 |
| 2003/0121211 A1 * | 7/2003 | Hashimoto et al. .......... 49/490.1 |

FOREIGN PATENT DOCUMENTS

| | | |
|---|---|---|
| JP | U-58-073017 | 5/1983 |
| JP | 59077938 A * | 5/1984 |
| JP | 62143714 A * | 6/1987 |
| JP | U-64-032217 | 2/1989 |
| JP | U-03-10922 | 2/1991 |
| JP | A-H09-039572 | 2/1997 |
| JP | A-11-34672 | 2/1999 |

* cited by examiner

DOOR WEATHER STRIP FOR MOTOR VEHICLE

CROSS-REFERENCE TO RELATED APPLICATION

This application is related to and claims priority from Japanese patent application No. 2004-255777, incorporated herein by reference.

BACKGROUND OF THE INVENTION

1. Field of the Invention

The present invention relates to a door weather strip for providing a seal between a door of a motor vehicle and a door opening portion of a vehicle body.

2. Description of Related Art

FIG. 1 shows a door seal structure including one example of a conventional door weather strip. As shown, a door weather strip 10 is attached to an outer periphery of a door frame 12 of a door 14, and an opening weather strip 16 is attached to a flange 18 projecting from a door opening portion 20 to provide a seal between the door 14 and the door opening portion 20. And a door glass run 22 is attached in a channel 24 secured to an inner periphery of the door frame 12 to provide a seal between a door glass 26 and the door 14.

The door glass run 22 has a generally U-shaped cross-section, and includes side walls 28 and 30 and a bottom wall 32. Seal lips 34 and 36 project from open ends of the side walls 28 and 30 for contacting and sealing the door glass 26.

The opening weather strip 16 includes a trim portion 38 having a generally U-shaped cross-section and a tubular seal portion 40. The opening weather strip 16 is attached to the flange 18 provided in the door opening portion 20 with the trim portion 38, and when the door 14 is closed, the door frame 12 contacts the tubular seal portion 40 to provide a seal between the door 14 and the door opening portion 20.

The door weather strip 10 includes a base portion 42, a main seal 44 and a seal lip 46. The main seal 44 and the seal lip 46 are formed on the upper side of the base portion 42 integrally therewith. The base portion 42 is fitted in a retainer 48 secured to the outer periphery of the door frame 12. When the door 14 is closed, the seal lip 46 contacts the door opening portion 20 to seal the gap between the door frame 12 and the door opening portion 20. And the main seal 44 contacts the door opening portion 20 on the inner side of the contacting position of the seal lip 46 to seal the gap between the door 14 and the door opening portion 20.

In the conventional door weather strip thus arranged, when the door 14 is closed, a peripheral edge of the door frame 12 presses the seal lip 46 against the door opening portion 20 to bend the seal lip 46. Consequently, depressions are formed in the seal lip 46 to deteriorate the appearance thereof.

When the motor vehicle is running at high speeds, the door 14 may be drawn and displaced outwardly due to the pressure difference between the interior and the exterior of the vehicle body, etc. Consequently, a tip end of the seal lip 46 may separate from the door opening portion 20 and project outwardly of the vehicle body, thereby degrading the sealing properties.

Accordingly, for providing a good appearance free from depressions which have been encountered with the seal lip of the conventional door weather strip, and for preventing the tip end of the seal lip from being drawn outwardly upon running of the motor vehicle at high speeds, as shown in FIG. 2, there has been proposed to provide a seal lip 50 having a generally hook-shaped cross-section (Publication of Japanese Utility Model application No. Hei 3-10922, FIGS. 2 and 3, etc.).

The seal lip 50 having a generally hook-shaped cross-section, however, may have the following problem. Namely, when the door 14 is opened and closed, the position of a tip end of the seal lip 50 may displace in a width direction of the vehicle body. When the door 14 is closed, and a middle part of the seal lip 50 contacts a roof moulding 52 attached along a roof-side of the door opening portion 20, the seal lip 50 may be deformed with the pressing of the roof moulding 52 to form depressions and projections between the door frame 12 and the roof moulding 52, and to separate the tip end of the seal lip 50 from the door frame 12 and project it outwardly of the vehicle body. At this time, a base of the seal lip 50 may be also deformed, whereby the seal lip 50 separates from the roof moulding 52 to degrade the sealing properties thereof.

Alternatively, a tubular part having a generally rectangular cross-section may be substituted for the above-described seal lips (Publication of unexamined Japanese Patent application No. Hei 11-34672, FIG. 1, ex.).

However, in this case, the following problem may occur. Namely, when the door is closed, a corner of the tubular part having a generally rectangular cross-section contacts the door opening portion so that walls of the tubular part on both sides of the corner may deform to increase the door closing force. In addition, depressions may be formed between the door opening portion and the door frame due to the deformation of the tubular part, thereby deteriorating the appearance therearound.

SUMMARY OF THE INVENTION

Accordingly, it is an object of the present invention to provide a door weather strip for a motor vehicle, of which a seal portion is capable of surely closing a gap between a vehicle door and a door opening portion, and exhibiting a good appearance and excellent sealing properties without forming any depression and projection.

In accordance with the present invention, the door weather strip for sealing between a vehicle door and a door opening portion of a vehicle body includes a base portion for attachment to an outer periphery of the door, and a seal portion which is integrally formed with the base portion for contacting the door opening portion to seal between the door and the door opening portion.

The seal portion includes a main seal for contacting the door opening portion, and a sub-seal for sealing between a peripheral part of the door and the door opening portion on the outer side of a contacting position of the main seal. The sub-seal has a protrusion which protrudes from the base portion towards the door opening portion, and a tubular part having a generally triangular cross-section of which one corner is integrally joined to the protrusion. One wall of the tubular part, which faces the one corner, is located between the door and the door opening portion.

With this arrangement, the door weather strip includes the base portion for attachment to the outer periphery of the door, and the seal portion which is integrally formed with the base portion for contacting the door opening portion to seal between the door and the door opening portion. The base portion of the door weather strip can be attached to the outer periphery of the door securely with the seal portion held in position, and consequently when the door is closed, the seal portion contacts the door opening portion and seals between the peripheral part of the door and the door opening portion.

The seal portion has the main seal for contacting the door opening portion and the sub-seal for sealing between the peripheral part of the door and the door opening portion on the outer side of the contacting position of the main seal. With this arrangement, the gap between the peripheral part of the door and the door opening portion can be doubly sealed, thereby preventing rainwater, dust, noise, etc. from intruding into a vehicle compartment, and exhibiting excellent sealing properties. Since the main seal is provided on the inner side of the sub-seal, the main seal is prevented from coming out of the vehicle body, if greatly deforms due to variations in assembling position of the door. In addition, the sub-seal can close the gap between the peripheral part of the door and the door opening portion to improve the outer appearance therearound.

The sub-seal has the protrusion which protrudes from the base portion towards the door opening portion, and also has the tubular part having a generally triangular cross-section. The protrusion of the sub-seal connects the base portion and the tubular part to each other, thereby holding the tubular part in position. The tubular part with a generally triangular cross-section elastically turns to surely seal the gap between the peripheral part of the door and the door opening portion.

One corner of the tubular part is integrally joined to the protrusion, and one wall of the tubular part, which faces the one corner, is located between the door and the door opening portion. With this arrangement, when the door is closed, the tubular part turns about the one corner thereof to decrease the door closing force, and surely seal the gap between the door and the door opening portion with good flexibility. And a generally flat face of tubular part is exposed between the door and the door opening portion to close the gap therebetween so that no depression is formed to exhibit a flat and smooth outer appearance.

It is preferable that the tubular part of the sub-seal is defined by an upper wall extending from a protruding end of the protrusion obliquely upwardly toward the door opening portion, a lower wall extending from the protruding end of the protrusion obliquely downwardly toward the peripheral part of the door, and a vertical wall extending to connect extending ends of the upper wall and the lower wall to each other. In the attached state, a lower end of the vertical wall contacts an inside face of the peripheral part of the door frame.

With this arrangement, when the door is closed, an upper corner defined by the extending end of the upper wall and an upper end of the vertical wall contacts and seals a roof-side end of the door opening portion. And, the upper corner is pressed by the door opening portion so that the tubular part is turned downwardly.

The extending end of the lower wall supports the lower end of the vertical wall to enable the same to contact and seal the peripheral part of the door.

And the vertical wall closes the gap between the peripheral part of the door and the door opening portion to seal the same. When the tubular part turns about its one corner joined to the protrusion, the lower end of the vertical wall slides on the inside face of the peripheral part of the door frame downwardly and continuously contacts the same to maintain good sealing properties, whereby the gap between the peripheral part of the door and the door opening portion can be continuously closed with the vertical wall to provide a flat outer appearance.

It is preferable that the protrusion has a thickness which is greater than that of each of the upper wall, the lower wall and the vertical wall of the tubular part of the sub-seal.

With this arrangement, when the door is closed and the tubular part of the sub-seal contacts the door opening portion, the protrusion does not readily deform to hold the tubular part of the sub-seal in position, thereby enabling the upper corner between the upper wall and the vertical wall of the tubular part to surely contact the door opening portion. Since the walls composing the tubular part are thin, they can readily flex so that at least the extending end of the lower wall continuously contacts the inside face of the peripheral part of the door frame while sliding thereon to continuously seal the same.

It is preferable that the inside face of the vertical wall projects inwardly along a widthwise center thereof to have an arc-shaped cross-section.

With this arrangement, when the door is closed and the tubular part is pressed by the door opening portion to be turned downwardly, the vertical wall having an arc-shaped cross-section is prevented from deforming to maintain a flat outer appearance, thereby closing the gap between the door opening portion and the peripheral part of the door frame, and preventing the occurrence of depressions and projections in the outside face of the vehicle body.

It is preferable that the protrusion, the lower wall of the tubular part of the sub-seal and the base portion define a space which enables the tubular part to readily turn.

With this arrangement, when the door is closed and the tubular part is pressed by the door opening portion, the lower wall can be turned toward the protrusion to facilitate the turning of the tubular part about its corner without any deformation. Therefore, good sealing properties can be ensured and the door closing force can be reduced.

It is preferable that the main seal has a tubular-configuration with a generally circular cross-section or a generally elliptical cross-section.

With this arrangement, where the contacting position of the sub-seal varies due to the variations of the assembling state of the door, the main seal enables the sure sealing around the door opening portion, and where the main seal greatly deforms, it can be prevented from coming out of the vehicle body, because the main seal is located on the inner side of the sub-seal.

As described above, with the door weather strip in accordance with the present invention, when the door is closed, the tubular part having the triangular cross-section can turn about its corner joined to the protrusion to surely seal the gap between the peripheral part of the door and the door opening portion. In addition, the upper and lower ends of the vertical wall respectively contact the door opening portion and the door frame, and consequently, a flat outside face of the vertical wall is exposed between the door opening portion and the door without forming any depression or projection, thereby giving a flat and smooth appearance to the outside face of the vehicle body.

In addition, by virtue of the triangular cross-section of the sub-seal, there does not occur such a problem that the projecting ends of the seal lips come off from the peripheral part of the door frame, and project outwardly, which has been encountered with the conventional door weather strips.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
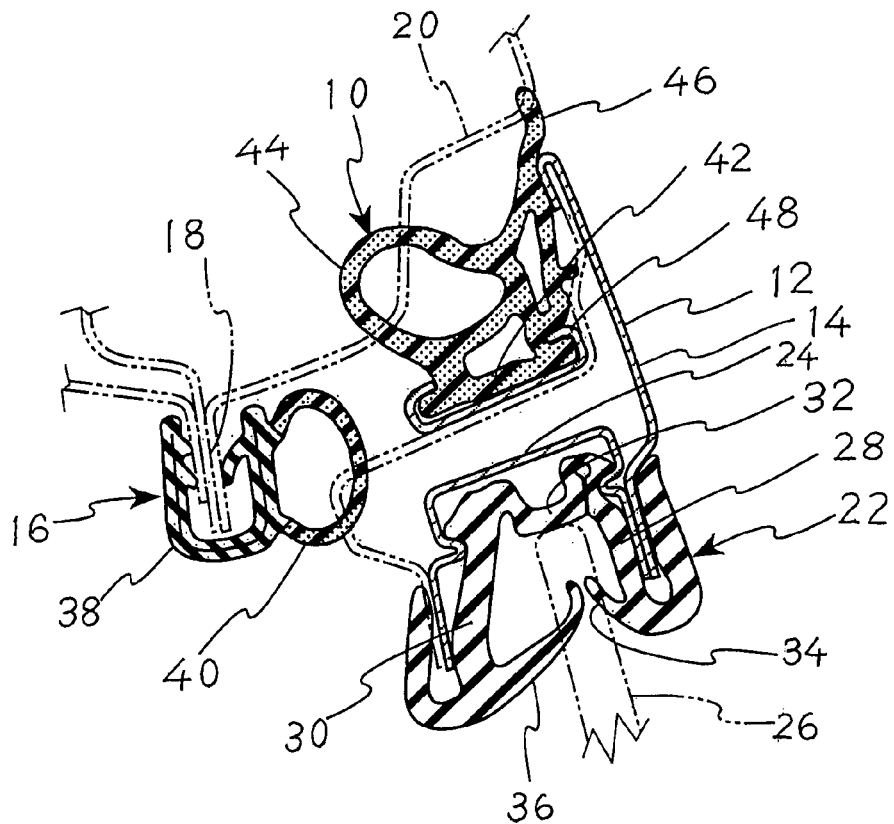
FIG. 1 is a cross-sectional view of a door seal structure including one example of a conventional door weather strip.
Figure 2:
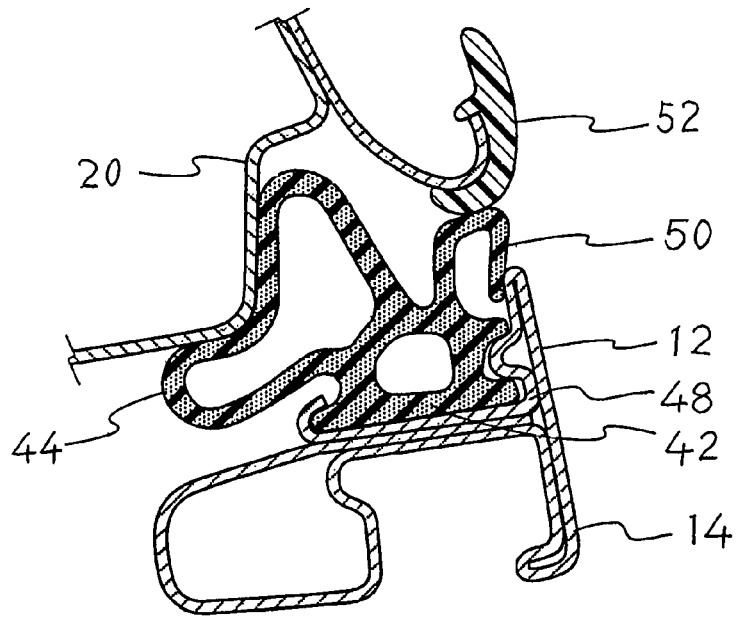
FIG. 2 is a cross-sectional view of another example of a conventional door weather strip.
Figure 3:
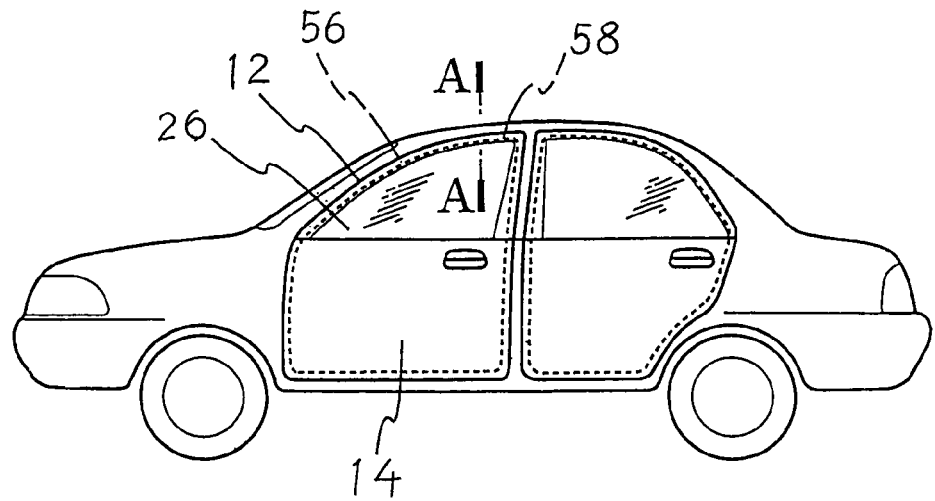
FIG. 3 is a side view of a motor vehicle.

One embodiment of the present invention will be explained with reference to FIGS. 3 through 5. FIG. 3 is a side view of a motor vehicle. As shown, a door weather strip 56 is attached along an outer periphery of a door frame 12 of a vehicle door 14 to provide a seal between the vehicle door 14 and a door opening portion.

A channel 58 is provided along an inner periphery of the door frame 12, and a glass run is attached in the channel 58 to guide the rising and lowering of a door glass 26 and effect a seal between the door glass 26 and the door frame 12.

Figure 4:
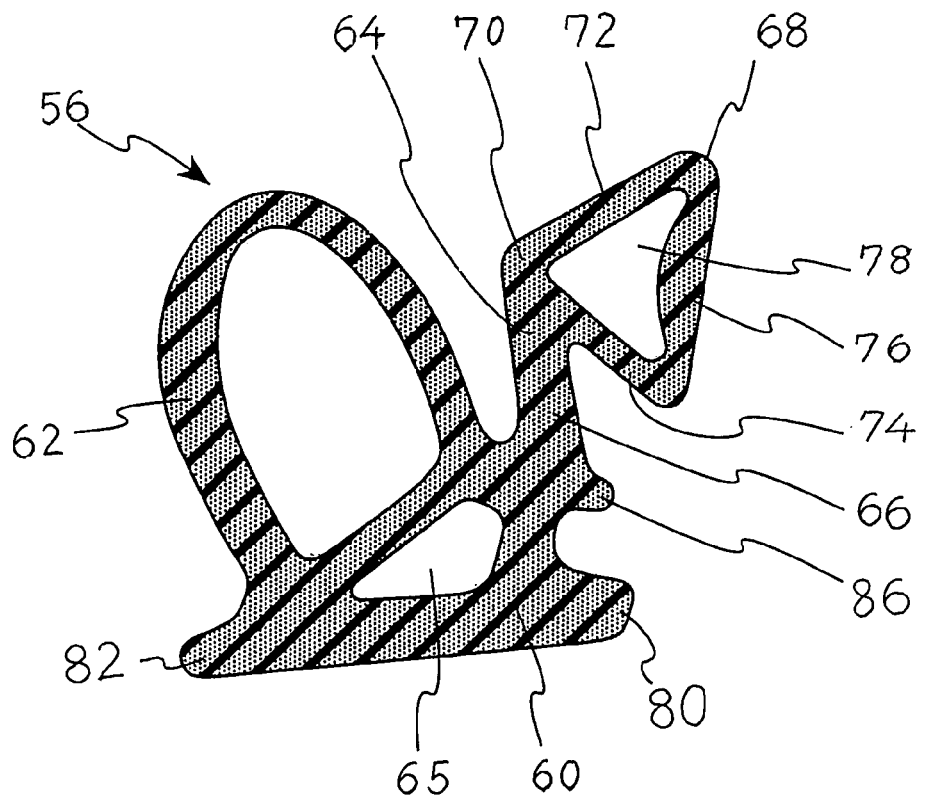
FIG. 4 is a cross-sectional view of one embodiment of a door weather strip in accordance with the present invention, which is taken along the line A-A of FIG. 3.

FIG. 4 is a cross-sectional view of the door weather strip 56 in one embodiment of the present invention. FIG. 5 is a cross-sectional view taken along line A-A of FIG. 3, and shows the attaching state of the door weather strip 56 to an outer periphery of the vehicle door 14.

The door weather strip 56 includes straight sections, each being formed by extrusion into a strip-shaped configuration, and corner sections, each being formed by molding to conform to a corner of the door frame 12.

As shown in FIG. 4, the door weather strip 56 includes a base portion 60, a main seal 62 and a sub-seal 64. The main seal 62 is formed on an inside part of the base portion 60 integrally therewith for contacting the door opening portion 20, and the sub-seal 64 is formed on an outside part of the base portion 60 integrally therewith to seal a gap between an outer periphery of the door frame 12 and a facing door opening portion 20.

The base portion 60 has a generally triangular cross-section of which the thickness gradually increases outwardly, and a space 65 is provided in a widthwise center thereof for reducing the weight of the door weather strip 56 and improving the flexibility of the base portion 60. Ribs 80 and 82 are formed integrally with the base portion 60 so as to project in a widthwise direction thereof for fitting the base portion 60 in a retainer 48 secured to the outer periphery of the door frame 12.

The sub-seal 64 which is formed on the outer side of the main seal 62 includes a protrusion 66 which protrudes from the base portion 60 towards the door opening portion 20 (FIG. 5), and a tubular part 68 which has a generally triangular cross-section, and is formed continuously along a protruding end 70 of the protrusion 66.

The tubular part 68 is composed of three walls, an upper wall 72, a lower wall 74 and a vertical wall 76. These three walls of the tubular part 68 define a space 78 having a triangular cross-section.

The upper wall 72 of the tubular part 68 extends from the protruding end 70 of the protrusion 66 obliquely upwardly toward the door opening portion 20. The lower wall 74 of the tubular part 68 extends from the protruding end 70 of the protrusion 66 obliquely downwardly toward a peripheral part 84 of the door frame 12.

The vertical wall 76 of the tubular part 68 extends generally vertically to connect extending ends of the upper wall 72 and the lower wall 74 to each other.

Figure 5:
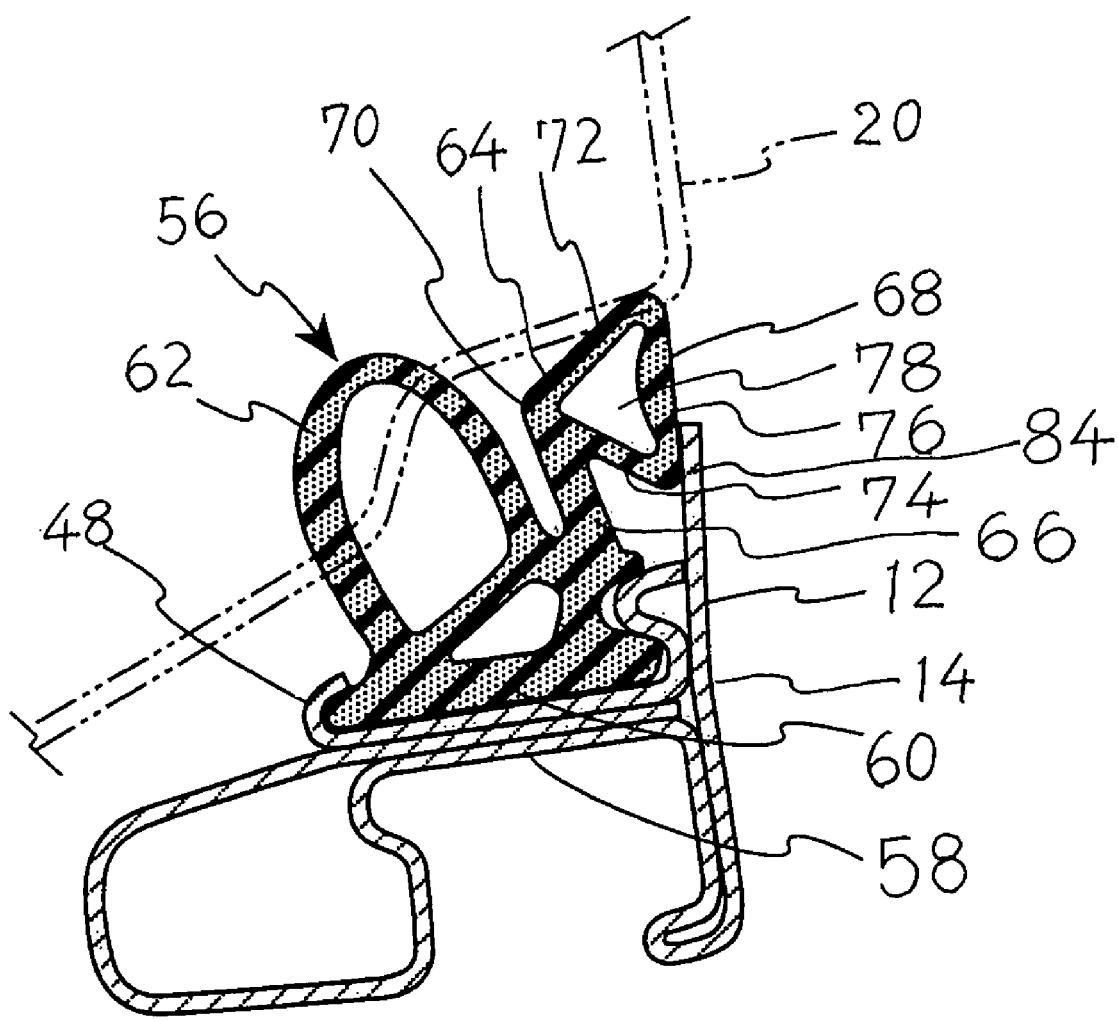
FIG. 5 is a cross-sectional view of one embodiment of a door weather strip in accordance with the present invention, which is attached to a vehicle door.

As shown in FIG. 5, the door weather strip 56 thus arranged is attached to the outer periphery of the door frame 12 such that a lower end of the vertical wall 76 of the tubular part 68 contacts an inside face of the peripheral part 84 of the door frame 12.

The protrusion 66 protrudes upwardly from the base portion 60 on the outer side of the space 65. The thickness of the protrusion 66 is made greater than that of each of the upper wall 72, the lower wall 74 and the vertical wall 76. Accordingly, when the tubular part 68 contacts the door opening portion 20 upon closing of the door 14, the thick protrusion 66 does not readily deform to hold the tubular part 68 in position. Consequently, an upper corner defined by the extending end of the upper wall 72 and an upper end of the vertical wall 76 can contact the door opening portion 20 surely. In addition, the wall thickness of the tubular part 68 is made less than that of the protrusion 66, and consequently, the tubular part 68 can readily flex to enable the lower end of the vertical wall 76 to continuously contact the inside face of the peripheral part 84 of the door frame 12 while sliding thereon, thereby continuously sealing the outer periphery of the door 14.

A notch, cut, slit, etc. may be provided in a joint between the protrusion 66 and the tubular part 68 to facilitate the turning of the tubular part 68.

As described above, the upper wall 72 of the tubular part 68 extends from the protruding end 70 of the protrusion 66 obliquely upwardly toward the door opening portion 20, and consequently, the extending end of the upper wall 72 and the upper end of the vertical wall 76, which is continuously formed with the upper wall 72, can contact a roof-side end of the door opening portion 20, thereby sealing the door opening portion 20.

The lower wall 74 of the tubular part 68 extends from the protruding end 70 of the protrusion 66 obliquely downwardly toward the peripheral part 84 of the door frame 12 to support the lower end of the vertical wall 76, thereby enabling the lower end of the vertical wall 76 to continuously contact and seal the inside face of the peripheral part 84 of the door frame 12.

The vertical wall 76 of the tubular part 68 is attached such that the lower end thereof contacts the inside face of the peripheral part 84 of the door frame 12, and consequently, when the door 14 is closed, the vertical wall 76 of the tubular part 68 can close the gap between the peripheral part 84 of the door frame 12 and the roof-side end of the door opening portion 20 to provide a seal between the door frame 12 and the door opening portion 20, and provide a flat and smooth outer appearance therebetween. And when the tubular part 68 is pressed by the door opening portion 20, the tubular part 68 turns about the protruding end 70 of the protrusion 66. At this time, the lower end of the vertical wall 76 slides on the inside face of the peripheral part 84 of the door frame 12 while contacting the same, thereby continuously exhibiting good sealing properties.

The vertical wall 76 may have such a configuration that the widthwise center thereof projects toward an interior of the space 78. In this case, when the door 14 is closed, and the tubular part 68 is pressed by the door opening portion 20 to turn downwardly, the vertical wall 76 having such a configuration and exhibiting high rigidity does not deform and keep its flat outside face. Consequently, the gap between the door opening portion 20 and the peripheral part 84 of the door frame 12 can be closed with the vertical wall 76, thereby ensuring a flat and smooth outer appearance of the vehicle body.

In addition, the vertical wall 76 of the tubular part 68, which projects inwardly, can be prevented from abnormally deforming or projecting outwardly when pressed by the door opening portion 20.

Furthermore, since the upper wall 72 and the lower wall 74 are made thin, they readily flex to contact the door opening portion 20 and the inside face of the peripheral part 84 of the door frame 12 without separating therefrom, thereby providing a good seal continuously.

The lower wall 74 extends from the protruding end 70 at a predetermined angle to the protrusion 66, and defines a space for enabling the tubular part 68 to turn therein. Consequently, when the door 14 is closed, and the tubular part 68 is pressed by the door opening portion 20, the tubular part 68 can turn downwardly about the protruding end 70 of the protrusion 66 such that the lower wall 74 approaches the protrusion 66. Accordingly, the tubular part 68 can readily turn downwardly about the protruding end 70 of the protrusion 66 while maintaining its triangular cross-section so that the tubular part 68 can continuously contact the door opening portion 20 and the door frame 12, whereby sealing properties can be maintained and the door closing force can be reduced.

Furthermore, as shown in FIG. 4, a groove is defined between a rib 86 and the rib 80 of the base portion 60. When the door weather strip 56 is attached to the door frame 12, an outside wall of the retainer 48 which is secured to the periphery of the door frame 12 is fitted in the groove of the base portion 60. Thus, the base portion 60 is held with the outside wall of the retainer 48 as well as an inside wall thereof, thereby holding the door weather strip 56.

With this arrangement, the ribs 80 and 82 of the base portion 60 can engage with the retainer 48 certainly, thereby sealing therebetween.

The inside face of the peripheral part 84 of the door frame 12 has a space between the lower end of the vertical wall 76 and the outside end of the retainer 48. When the tubular part 68 is pressed by the door opening portion 20, the vertical wall 76 can slide downwardly on the inside face of the peripheral part 84 of the door frame 12 by the distance corresponding to the space therein. Consequently, the vertical wall 76 is prevented from bending and projecting outwardly from the gap between the door opening portion 20 and the peripheral part 84 of the door frame 12. In addition, since the vertical wall 76 can readily slide on the inside face of the peripheral part 84 of the door frame 12, a good seal can be provided between the door opening portion 20 and the peripheral part 84 of the door frame 12.

The main seal 62 protrudes inwardly from an upper wall of the base portion 60 with a triangular cross-section, and has a tubular configuration with a generally circular or elliptical cross-section.

When the door 14 is closed, the main seal 62 contacts the door opening portion 20 on the inner side of the sub-seal contacting position, and flexes to conform to the configuration of the door opening portion 20, thereby doubly sealing the gap between the door frame 12 and the door opening portion 20.

In the embodiment shown in FIGS. 4 and 5, the base portion 60 is fitted in the retainer 48. Alternatively, the door weather strip 56 may be attached to the outer periphery of the door frame 12 with a double-sided adhesive tape which has been previously bonded to a rear face of the base portion 60 without providing any retainer in the door frame 12. With this arrangement, no retainer is needed to contribute to the decrease in the weight of the vehicle body.

Hereinafter, the producing method of the door weather strip 56 will be explained.

Straight sections of the door weather strip 56 are composed of synthetic rubber such as EPDM rubber, etc., thermoplastic elastomer such as polyolefin-based elastomer, etc., or soft synthetic resin such as soft vinyl chloride, etc. It is preferable that these materials are foamed into sponge-shaped materials for improving the flexibility of the straight sections of the door weather strip 56.

In the case of synthetic rubber, after extrusion, the straight sections are transferred to a vulcanizing chamber, and heated with heated air, high frequency wave or the like to carry out vulcanization and foaming of the synthetic rubber. In the case of thermoplastic elastomer and soft synthetic resin, at the same time with or after extrusion, the straight sections are heated for foaming, and cooled for solidifying. Then, the obtained straight sections are cut to have desired lengths.

The main seal 62 and the sub-seal 64 may be composed of a sponge rubber. In this case, the flexibility thereof is enhanced to enable them to flex to conform to the configurations of the door opening portion 20 and the door frame 12, thereby improving the sealing properties. In addition, the weight of the door weather strip 56 can be decreased to contribute to the decrease in the weight of the vehicle body. The base portion 60 can be composed of a hard rubber.

Where the base portion 60 is composed of a hard material, and the main seal 62 and the sub-seal 64 are composed of a sponge material, these materials are integrally extruded at the same time by a dual extrusion process.

Where the base portion 60 is composed of a hard rubber, the base portion 60 can be strongly attached to the door frame 12, whereby the door weather strip 56 can be secured stably. Alternatively, the base portion 60 may be composed of a sponge rubber. In the case of sponge rubber, the base portion 60 can be formed with the same material as that of the main seal 62 and the sub-seal 64, and then vulcanized together, whereby the productivity of the door weather strip is enhanced, and the weight of the door weather strip can be reduced to contribute to the decrease in the weight of the vehicle body.

Next, molded parts are formed by placing ends of extruded parts thus cut in a mold, and injecting a sponge rubber or hard rubber in a cavity of the mold. The cross-sectional shape of the molded parts is approximately identical to that of the extruded parts. It is preferable for the molded parts to use the material of the same kind as the material for the extruded parts. In the case of synthetic rubber, after injected in the cavity of the mold, the mold is heated to vulcanize and foam the synthetic rubber, and where the extruded parts and the molded parts are composed of the identical material or the same kind of material, they bond to each other due to vulcanization thereof. In the case of thermoplastic elastomer or soft synthetic resin, the material is injected into the mold in a molten state so that the extruded parts and the molded parts fusion-bond to each other due to heat and pressure of the injected material.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door weather strip for sealing between a door of a motor vehicle and a door opening portion of a vehicle body comprising:
   a base portion for attachment to an outer periphery of the door; and
   a seal portion which is integrally formed with said base portion for contacting the door opening portion to seal between the door and the door opening portion, said seal portion including a main seal for contacting the door opening portion and a sub-seal for sealing between an extending peripheral part of the door and a roof-side end of the door opening portion on an outer side of said main seal, said sub-seal including a protrusion which protrudes from said base portion towards the door opening portion, and a tubular part having a generally triangular cross-section, of which one corner is integrally joined to said protrusion on an outer side thereof, so that the tubular part turns about a protruding end of said protrusion, wherein said tubular part is composed of an upper wall extending from said protruding end of said protrusion obliquely upwardly toward the roof-side end of the door opening portion, a lower wall extending from said protruding end of said protrusion obliquely downwardly toward the extending peripheral part of the door, and a vertical wall extending to connect an extending end of said upper wall and an extending end of said lower wall to each other between the door and the door opening portion, said vertical wall has a flat outside face, and contacts an inside face of the extending peripheral part of the door at a lower end thereof, said protrusion has a thickness which is greater than that of each of said upper wall, said lower wall and said vertical wall, and an inside face of said vertical wall projects inwardly along a widthwise center thereof to have an arc-shaped cross-section, wherein said protrusion, said lower wall and said base portion define a space which enables said tubular part of said sub-seal to readily turn.

2. A door weather strip as claimed in claim 1 wherein said main seal has a tubular configuration with one of a generally circular cross-section and a generally elliptical cross-section.

* * * * *